(No Model.) 3 Sheets—Sheet 1.
G. QUICK.
BREECH LOADING ORDNANCE.
No. 370,657. Patented Sept. 27, 1887.
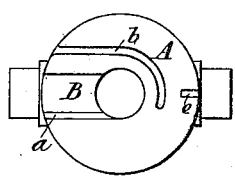
Fig. 1.
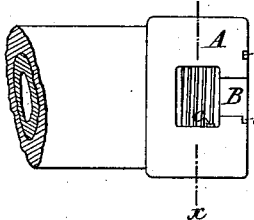
Fig. 2.
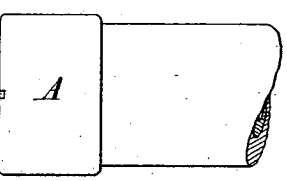
Fig. 3.
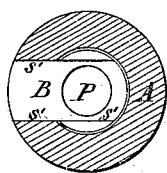
Fig. 4.
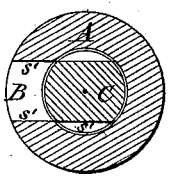
Fig. 4a.
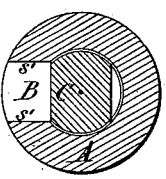
Fig. 4b.
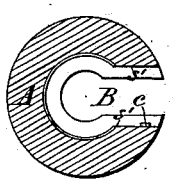
Fig. 5.
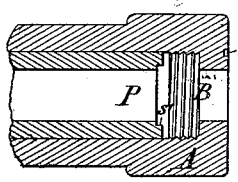
Fig. 6.
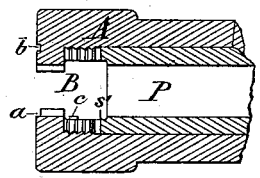
Fig. 7.
 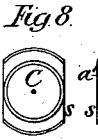 
Fig. 8. Fig. 9. Fig. 10.
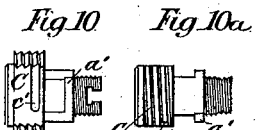
Fig. 10a.
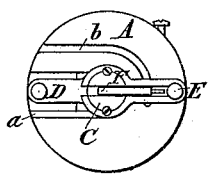
Fig. 11.
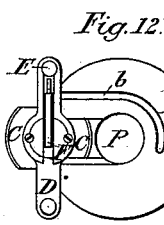
Fig. 12.
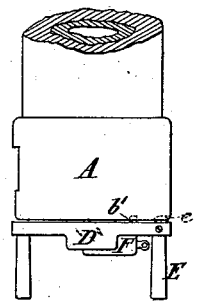
Fig. 13.
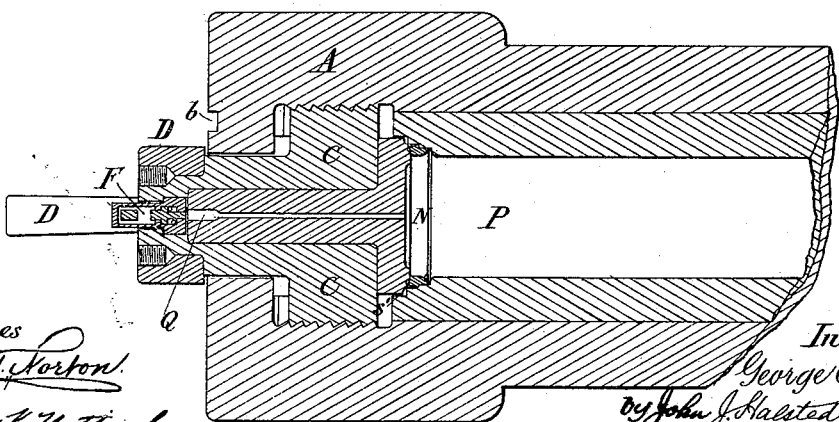
Fig. 14.
Witnesses
Will T. Norton
Willie L. Nottingham
Inventor
George Quick
by John J. Halsted & Son
his Attys.
N. PETERS, Photo-Lithographer, Washington, D. C.

(No Model.) 3 Sheets—Sheet 2.

G. QUICK.
BREECH LOADING ORDNANCE.

No. 370,657. Patented Sept. 27, 1887.

Witnesses
Will T. Norton
Willie K. Nottingham

Inventor
George Quick
by John J. Halsted & Son
his Attys.

(No Model.) 3 Sheets—Sheet 3.

G. QUICK.
BREECH LOADING ORDNANCE.

No. 370,657. Patented Sept. 27, 1887.

Witnesses
Will T. Norton
William Nottingham

Inventor
George Quick
by John J. Halsted & Son
his Attys.

UNITED STATES PATENT OFFICE.

GEORGE QUICK, OF CHIPPING CAMPDEN, COUNTY OF GLOUCESTER, ENGLAND.

BREECH-LOADING ORDNANCE.

SPECIFICATION forming part of Letters Patent No. 370,657, dated September 27, 1887.

Application filed January 15, 1887. Serial No. 224,418. (No model.) Patented in England March 24, 1886, No. 4,139; in France January 12, 1887, No. 180,851; in Belgium January 18, 1887, No. 75,995; in Germany January 23, 1887, No. 40,870; in Italy March 31, 1887, XX, 21,141, XLII, 134; in Spain April 18, 1887, No. 6,711, and in Austria-Hungary June 6, 1887, No. 6,109 and No. 26,572.

*To all whom it may concern:*

Be it known that I, GEORGE QUICK, a subject of the Queen of Great Britain, residing at Chipping Campden, in the county of Gloucester, England, have invented new and useful Improvements in Ordnance, (which has been patented in Great Britain by Letters Patent No. 4,139, dated March 24, 1886; in France by Letters Patent No. 180,851, dated January 12, 1887; in Belgium by Letters Patent No. 75,995, dated January 18, 1887; in Germany by Letters Patent No. 40,870, dated January 23, 1887; in Italy by Letters Patent Vol. XX, No. 21,141, Vol. XLII, No. 134, dated March 31, 1887; in Spain by Letters Patent No. 6,711, dated April 18, 1887, and in Austria-Hungary by Letters Patent No. 6,109 and No. 26,572, dated June 6, 1887,) of which the following is a specification.

My invention relates to improvements in breech-loading ordnance.

In carrying my invention into effect I substitute for the breech-screw and sliding carriage or sliding block described in the specification of former Letters Patent granted to me, No. 258,116, dated the 16th May, 1882, a solid cylindrical breech-screw without any sliding carriage connected therewith. I make this breech-screw considerably larger in diameter than the powder-chamber, and I form parallel plane surfaces on opposite sides thereof, so as to remove on each side about one-quarter of the screw-thread, thereby leaving two screwed surfaces opposite each other, each screwed surface occupying about one-quarter of the circumference of the said breech-screw. I form a suitable slideway or recess in the breech of the gun, one part of which has parallel plane surfaces, and the other part of which, immediately in the rear of the powder-chamber, is cylindrical. In the cylindrical recess a female screw-thread is formed to receive the screwed part of the said breech-screw, so that the said breech-screw may be made to revolve in the rear of the powder-chamber. It will be seen that the breech-screw can thus slide in the plane part of the recess and rotate in the circular portion of the recess. In connection with the rear end of the said breech-screw I form a projection for butting up against a slot or guide formed on the rear face of the breech of the gun, so as to allow the said breech-screw to be turned exactly through the required angle to bring it into position for sliding in the plane part of the slideway from the center to the outside of the gun, so that the breech or powder-chamber may be opened by means of the lever, which is secured to the rear end of the said breech-screw. With this mechanism metallic obturation, or the asbetus pad known as the "De Bange" system of obturation, may be used. For heavy guns, in which the breech-screw may be of great weight, I mount a small gear-wheel or pinion which may carry a crank-handle on the end of the breech-screw lever to gear into a rack affixed to the rear face of the breech of the gun, the said rack having one part circular and one part straight, and constructed so that in opening the breech the continuous turning of the said pinion will cause the breech-screw to revolve through a part of a revolution and then to move in a straight line from the center of the breech to the side of the gun. The reverse motion of the said pinion will slide the breech-screw in a straight line back to the center of the gun and then cause the said breech-screw to revolve, so as to effectually close the breech. In still heavier guns the revolving and sliding motion would be imparted to the breech-screw by means of fluid-pressure actuating a piston with a rack attached gearing into a wheel secured on the breech-screw.

I provide for firing the gun by percussion primers or electric primers by means of a self-cocking percussion-lock, and I actuate the vent-shutter, which forms the base of the said percussion-lock, by means of a short locking-lever which is mounted in the end of the breech-screw lever. This locking-lever is provided with a toothed sector which engages in a rack formed on the base of the firing-lock, or by other well-known substitutes for communicating a reciprocating motion.

I employ an improved primer-extractor which is actuated by means of the motion of the percussion-lock, and which is an improvement on the extractor described and shown in my prior patent, No. 324,272, of the 11th August, 1885. The extractor-plate has a guide-pin secured on the upper side thereof, on one part of which guide-pin rack-teeth are cut, and in the lower end of the extractor-plate I secure another cylindrical guide-pin, which works in a suitable recess under the primer-chamber. I form a recess immediately over the rack-teeth of the upper guide-pin and fit therein the extractor-lever having two arms at right angles. The end of each arm is formed to the segment of a circle and suitable teeth are cut therein. The teeth in the lower and longer arm gear into the rack cut in the upper guide-pin of the extractor, and those in the other or short arm of the lever gear into a rack formed in the under side of the percussion-lock. By these means the act of lifting the locking-lever withdraws the percussion-lock from the primer-chamber and jerks the extractor-plate from its seat, by which the primer is sharply ejected.

In order to enable my invention to be fully understood, I will proceed to describe the same by reference to the accompanying drawings, in the several figures of which similar letters of reference indicate corresponding parts.

Figure 1 is an elevation of the rear face of the breech of the gun without any of the breech mechanism attached. Fig. 2 is an elevation of the left-hand side of the breech, showing the recess for the sliding breech-screw. Fig. 3 is an elevation of the right-hand side of the breech. Fig. 4 is a vertical transverse section on line $x\,x$ of Fig. 2, looking toward the muzzle of the gun. Fig. $4^a$ is a similar section showing the breech-screw in position ready for sliding out to open the chamber, or for screwing up to close the chamber gas-tight. Fig. $4^b$ is a similar section showing the breech-screw in position as when screwed up with chamber closed ready for firing. Fig. 5 is a vertical transverse section, also on line $x\,x$ of Fig. 2, but looking toward the rear end of the breech. Fig. 6 is a vertical longitudinal section showing the right-hand side of the gun, and Fig. 7 is a similar section showing the opposite or left-hand side of the gun. In these figures no breech-fittings are shown, (except the breech-screw in Figs. $4^a$ and $4^b$.) Fig. 8 is an elevation of the forward end of the breech-screw, showing the face for closing the rear end of the powder-chamber. Fig. 9 is an elevation of the rear end of the breech-screw, without lever or fittings; and Fig. 10 is an elevation of the left-hand side of the breech-screw, also without fittings, and Fig. $10^a$ is a plan of the same. Fig. 11 is an elevation of the rear face of the breech of the gun, with breech-screw and lever complete, closed, as when ready for firing. Fig. 12 is a similar view showing the breech open, as when ready for loading. Fig. 13 is a plan of the breech closed, as when ready for firing. Fig. 14 is an enlarged vertical longitudinal section of the breech when closed, as ready for firing. Fig. 15 is an elevation of the breech of a large gun. Fig. 16 shows the cylinder for fluid-pressure; Fig. 17, an enlarged elevation of the front face of the breech-screw lever; Figs. 18 and 19, vertical sections of the same. Figs. 20 to 29, inclusive, show certain modifications for using the asbestus obturator.

Referring to Figs. 1 to 14, inclusive, A is the body of the gun. B is the recess formed to receive the sliding breech-screw C. D is the breech-screw lever, and E is the locking-lever (shown on a larger scale in Figs. 18 and 19) mounted in the end of the breech-screw lever to secure the same to the gun by means of a projection on the end of the lever which enters into a notch, $e$, in the breech of the gun when the lever E is pulled into the position shown in Fig. 19. F is the firing-lock for igniting the charge, and P is the powder-chamber.

$a$, Figs. 1, 2, and 7, indicates a guide cut in the rear face of the breech of the gun, and $a'$, Figs. 9 and 10, indicates the stop on the breech-screw which engages in the guide $a$, by which the breech-screw is allowed to turn only into the correct position for sliding outward to the side of the gun. The groove $b$, cut in the rear face of the gun, has the curved part concentric with the chamber, and in the front side of the breech-screw lever a pin is fitted to gear into this groove, so that as the lever is turned round the breech-screw shall be drawn directly into the center line of the chamber.

In Figs. 2, 5, and 7, $c$ indicates a stop-pin in the base of the rectangular recess, which stop-pin is inserted after the breech-screw is placed in the gun, to prevent the breech-screw being drawn too far out of the recess. $c'$, in Figs. 10 and $10^a$, indicates the shallow groove cut in the side of the breech-screw, to gear over the said stop-pin $c$.

The operation of my improved gun is as follows: When the breech-screw is in the position shown in Fig. 12, the breech is open ready for the gun to be loaded. The gun having been loaded, the breech-screw is then caused to slide along the plane surfaces of the recess by pulling the handles D and E of the breech-screw lever. During this motion of the breech-screw the plane faces of the breech-screw, formed on the forward portion thereof, (which is of greater diameter than the bore of the gun,) and the middle portion (which is of the same diameter as the bore of the gun) slide upon the plane faces of the forward and rear portions of the recess. At the same time the guide or stop $a'$, Figs. 9, 10, and $10^a$, slides in the guideway $a$, and the guideway $c'$, Figs. 10 and $10^a$, slides over the stop $c$, Figs. 2, 5, and 7, and the nose of the breech-screw rests upon and slides along the lower plane surface, $s'$, in the front of the recess. When the breech-screw has arrived at a position concentric with the axis of the gun-chamber, the forward screwed portion of the breech-screw is engaged in the female screw of the recess and a motion of rotation is communicated to the breech-screw by means of the breech-screw lever D. The breech-screw is thus caused to turn through a right angle, by which movement the nose of the breech-screw is brought tight up against the gas-ring N, (see Fig. 14,) and a good joint is made. When the breech-screw has thus been turned into the firing position, the handle E is pulled out from the position shown in Fig. 18 to that shown in Fig. 19, and the gun is by this movement locked and made ready for firing, as hereinafter explained.

Fig. 17 is an elevation, on an enlarged scale, of the front face of the breech-screw lever. Fig. 18 is a vertical section of the same, on a further enlarged scale, with firing-lock drawn back and vent open ready for priming, and Fig. 19 is a similar section of the same closed ready for firing, showing the combination of the locking-lever E with the percussion firing-lock F, and of the percussion-lock F with the primer-extractor $q$.

In Figs. 17, 18, 19, $b'$ is the pin in the lever for gearing into the groove $b$ in the breech of the gun. The breech-screw lever D, Figs. 18 and 19, the locking-lever E, and the firing-lock F are arranged so as to be actuated by the locking-lever E. Q represents the primer-chamber, and $q$ the extractor-plate, and $h$ is the extractor-lever with two arms, each arm having teeth therein, those in the upper arm gearing into the rack $k$, formed in the base of the firing-lock, and those in the lower arm into the rack formed in the guide-pin $r$ of the extractor-plate $q$.

Fig. 15 is an elevation of the breech of a gun of large size, in which figure a pinion, $g$, is shown mounted in the end of the breech-screw lever D, which pinion gears into the curved rack G, which is secured on the face of the gun A. Fig. 16 is an elevation of the breech of a gun, also of large size, showing the application of fluid-pressure for working the breech-screw.

In Fig. 15, G is the curved and straight rack secured to the gun, and $g$ is the pinion mounted in the lever for gearing into the said rack, and H is the crank-lever for working the pinion $g$.

In Fig. 16, M represents the cylinder for fluid-pressure. R is the rack actuated by the piston in the cylinder M, and $u$ is the lever for admitting and exhausting the fluid from either end of the said cylinder. T is the gear-wheel secured to the breech-screw C, and E is the locking-lever, and F is the firing or percussion lock.

All the figures hereinbefore described show the details of this breech-loading system as applied when using a metallic obturation; but for using the asbestos obturation in this system certain modifications would be required, as shown in Figs. 20, 21, 22, 22$^a$, 22$^b$, 23, 24, 25, 26, 27, 28, and 29.

Figs. 20 and 21 show transverse sections similarly taken to the sections in Figs. 4 and 5. Fig. 22 is a vertical longitudinal section. Fig. 22$^a$ is also a similar section of the gun, but showing the breech-screw C in elevation and in position as when the gun is ready for firing. Fig. 22$^b$ is also a similar section of the gun, but showing the breech-screw in elevation and in position ready for sliding out to the side of the gun to open the breech, or for being pushed forward into position for screwing up to the firing position; and Fig. 23 is a horizontal section of the breech of the gun. In these figures it will be observed that the female screw-thread is removed from the right-hand side of the breech-screw recess B at $w$; hence in the operation of closing the breech for firing, when the breech-screw has been caused to slide into the position in which it is co-axial with the gun-chamber, there is no engagement of the breech-screw thread with the female screw-thread of the recess; hence the breech-screw can be pushed forward so as to insert the asbestus obturator into the chamber, and after this forward movement the breech-screw is turned through a right angle, as before, the screw-threads engage, and the breech-screw is locked in position. In opening the breech after firing, the process is reversed. The breech-screw is first turned through a right angle, which disengages the screw-threads. The breech-screw is then pulled back in the recess, so as to withdraw the obturator, and the breech-screw is then caused to slide transversely, so as to open the breech.

Figure 15:
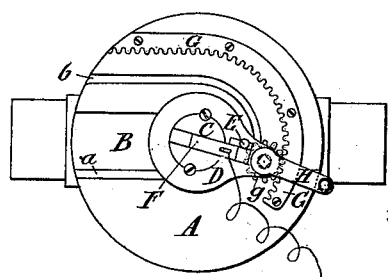
Figure 16:
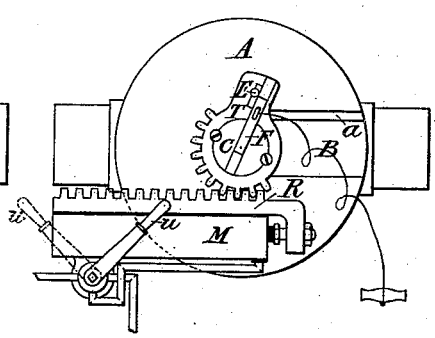
Figure 17:
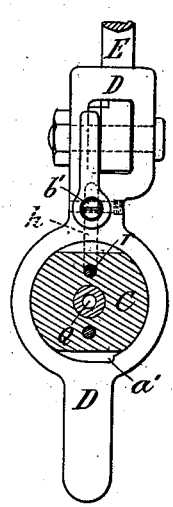
Figure 18:
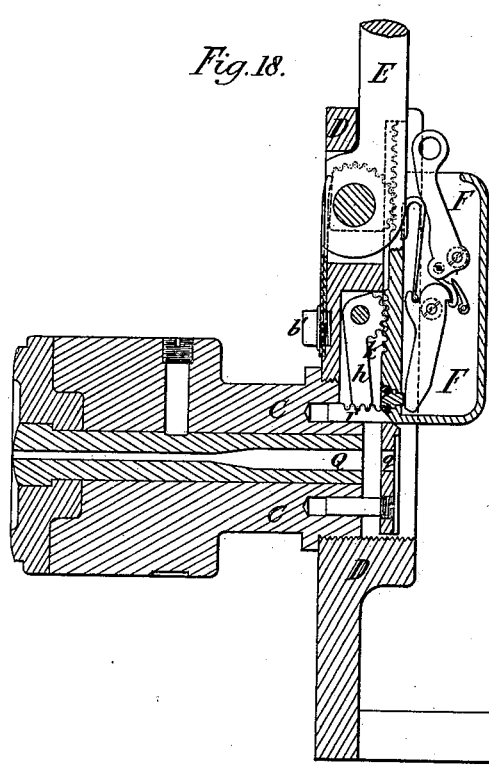
Figure 19:
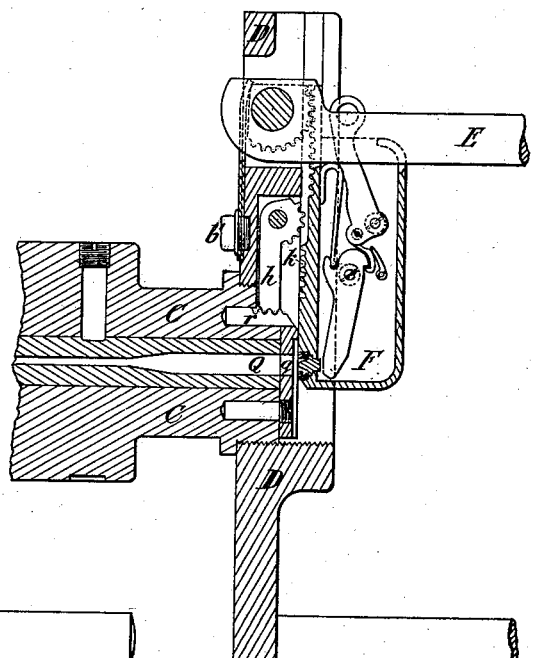
Figure 20:
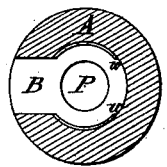
Figure 21:
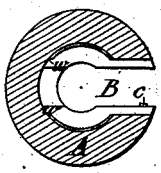
Figure 22:
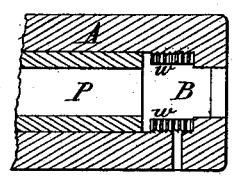
Figure 22A:
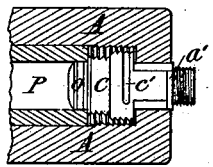
Figure 22B:
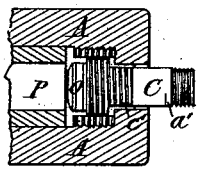
Figure 23:
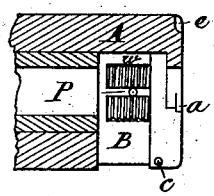
Figure 24:
Fig. 24 is an elevation of the rear face of the breech-screw, shown with a portion of the end removed.
Figure 25:
Fig. 25 is an elevation of the front face of the breech-screw with an asbestos obturator.
Figure 26:
Figs. 26 and 27 are views of the breech-screw in directions at right angles to one another.
Figure 27:
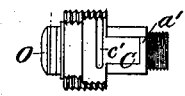
Figure 28:
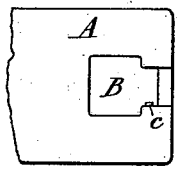
Fig. 28 is an elevation of the left-hand side of the breech of the gun, showing the form of recess for the breech-screw, with asbestos obturator.
Figure 29:
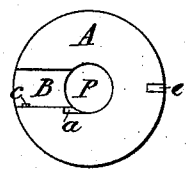
Fig. 29 is an elevation of the rear face of the breech of the same gun without the breech-screw fittings.

Having thus fully described the nature of my said invention, I wish it to be distinctly understood that I do not confine myself strictly to all the details herein described, as such may be varied somewhat without departing from the principles or essence of the said invention; but

What I claim is—

1. In combination with a breech-loading gun having a transverse opening to permit the breech-block to be slid transversely to axial position in the breech of the gun, a breech-block having opposite parallel plane surfaces and intermediate screw-sections, which latter engage corresponding sections in the breech-chamber of the gun.

2. The improved breech-loading gun, having, in combination, the body A, provided with a recess, B, and guide c, means, substantially as set forth, for opening and closing the breech, locking-lever E, mounted in the end of the breech-screw lever, firing-lock F, actuated by the locking-lever, chamber Q, extractor-plate q, located at the rear of the chamber, and the two-armed and toothed extractor-lever h, arranged to engage with the rack-bar k and with the toothed guide-pin r of the extractor, all as set forth.

3. In combination, the body A, having the recess B, with a portion of its screw-thread removed, the breech-screw C, obturator o, mechanism, substantially as described, for opening and closing the breech, locking-lever E, firing-lock F, actuated by such lever, chamber Q, extractor-plate q, located at the rear of the chamber, and extractor-lever h, all as set forth.

4. The combination consisting of the locking-lever located at the breech of the gun, the vent-shutter, firing-lock actuated by the locking-lever, primer-extractor, and extractor-lever, arranged and operating as hereinbefore described and shown.

GEORGE QUICK.

Witnesses:
JAMES C. PHILLIPS,
*51 Well Street, Plymouth, Clerk to Fredk. Wm. Skarden, Solicitor and Notary Public, Plymouth.*
FREDK. W. SKARDON,
*Notary Public, 3 Bedford Street, Plymouth.*